United States Patent Office 2,971,943
Patented Feb. 14, 1961

2,971,943
PROCESS FOR PREPARING ALCOHOL MODIFIED MELAMINE RESIN

Louis J. Lombardi, Kansas City, Mo., assignor to Cook Paint & Varnish Company, North Kansas City, Mo., a corporation of Delaware No Drawing. Filed Apr. 28, 1959, Ser. No. 809,353

4 Claims. (Cl. 260—67.6)

This invention relates to a process of preparing an alcohol modified melamine resin which is suitable for surface coatings.

An object of the present invention is to provide a process for preparing an alcohol melamine resin in which the reaction is carried out in the presence of a novel catalyst.

Another object of the present invention is to provide a process of preparing an alcohol modified melamine resin in which the reaction is carried out in the presence of a novel acid catalyst followed by neutralization with a novel neutralizing agent.

A further object of the present invention is to provide a process of preparing an alcohol modified melamine resin which is simple in execution, and commercially feasible.

Briefly stated, the process of preparing an alcohol modified melamine resin comprises reacting together melamine, butyl alcohol, and formaldehyde, in the presence of cobaltous nitrate as the acid catalyst, followed by neutralization with a neutralization agent such as magnesium carbonate, the melamine and formaldehyde being employed in the molar ratio of from 1:4 to 1:6. Preferably, the cobaltous nitrate is present in an amount from about .02% to and not exceeding .2% by weight. Also, the reaction is preferably carried out at a temperature range from 212° Fahrenheit to and about 270° Fahrenheit.

Several specific examples of the process of preparing an alcohol modified melamine resin according to the present invention are as follows:

|  | Parts by Weight | Parts by Weight | Parts by Weight | Parts by Weight |
|---|---|---|---|---|
| Melamine Crystals | 126 | 126 | 126 | 126 |
| N-Butyl formcel [1] | 450 | 450 | 375 | 300 |
| N-Butyl alcohol | 190 | 190 | 220 | 250 |
| Cobaltous Nitrate Co(NO$_3$)$_2$.6H$_2$O | 0.2 | 0.5 | 1.0 | 1.4 |
| Magnesium Carbonate, MgCO$_3$ | 0.6 | 1.2 | 2.4 | 3.0 |
| Percent Cobaltous Nitrate | .026 | .065 | .14 | .2 |

[1] 40% solution of formaldehyde in N-butyl alcohol, marketed by Celanese Corporation.

In each of the above examples, the melamine, n-butyl formcel, n-butyl alcohol and cobaltous nitrate were placed in a reaction vessel, and the mixture was then refluxed at atmospheric pressure for about one-half hour. The magnesium carbonate was added at this point and water was removed by azeotropic distillation. When the water was essentially removed, the resulting solution was then concentrated under approximately 20 inches of mercury vacuum until the temperature of the solution was about 270° Fahrenheit. Then naphtha or mineral spirits were added to obtain a solution containing 60% solids, and the solution filtered. After filtering, the solution was clear and straw colored. Flms baked through a temperature gradient of 250° Fahrenheit to 450° Fahrenheit were extremely flexible and had a high gloss. Of course, the solution obtained may be diluted with surface coating solvents other than naphtha as, for example, butyl cellulose, toluene, xylol, etc.

It is to be noted that the thus described process was carried out in turn with a conventional and well-known acid catalyst substituted for the cobaltous nitrate, such acid catalyst being formic acid, oxalic acid, maleic acid, maleic anhydride, phthalic anhydride, nitric acid, hydrochloric acid, phosphoric acid, zinc chloride, and results obtained compared with that resulting from the practice of the instant invention employing cobaltous nitrate. The results obtained by the tests with the named conventional acid catalysts were substantially similar, whereas those obtained by the instant invention were markedly different. In the case of the tests with the named conventional acid catalysts the resin obtained was 50 to 55% non-volatile and had a viscosity of approximately L–Y on the Gardner-Holdt scale, whereas, the resin obtained by employment of cobaltous nitrate was 68 to 72% non-volatile with a viscosity of D–G on the Gardner-Holdt scale. Also, the films prepared from the resins obtained from the tests employing the named conventional acid catalysts, when baked for one-half hour at 300° Fahrenheit became brittle and infusible, whereas in the case of the resin obtained by employing cobaltous nitrate when baked for one-half hour at 300° Fahrenheit was flexible and tack-free, and retained this flexibility and tack-freeness during further baking cycles.

What is claimed is:

1. In the process of preparing an alcohol modified melamine resin by reacting together melamine, butyl alcohol, and formaldehyde in the presence of an acid catalyst and at a temperature from 212° Fahrenheit to and about 270° Fahrenheit, the melamine and formaldehyde being employed in the molar ratio of from 1:4 to 1:6, the improvement consisting in employing as the acid catalyst cobaltous nitrate in a small amount.

2. In the process of preparing an alcohol modified melamine resin by reacting together melamine, butyl alcohol, and formaldehyde in the presence of an acid catalyst and at a temperature from 212° Fahrenheit to and about 270° Fahrenheit, the melamine and formaldehyde being employed in the molar ratio of from 1:4 to 1:6, the improvement consisting in employing as the acid catalyst cobaltous nitrate in a small amount, and neutralizing with magnesium carbonate.

3. In the process of preparing an alcohol modified melamine resin by reacting together melamine, butyl alcohol, and formaldehyde in the presence of an acid catalyst and at a temperature from 212° Fahrenheit to and about 270° Fahrenheit, the melamine and formaldehyde being employed in the molar ratio of from 1:4 to 1:6, the improvement consisting in employing as the acid catalyst cobaltous nitrate in an amount from about .02% to and not exceeding .2% by weight.

4. In the process of preparing an alcohol modified melamine resin by reacting together melamine, butyl alcohol, and formaldehyde in the presence of an acid catalyst and at a temperature from 212° Fahrenheit to and about 270° Fahrenheit, the melamine and formaldehyde being employed in the molar ratio of from 1:4 to 1:6, the improvement consisting in employing as the acid catalyst cobaltous nitrate in an amount from about .02% to and not exceeding .2% by weight, and neutralizing with magnesium carbonate.

References Cited in the file of this patent

UNITED STATES PATENTS 2,702,258 Amick _____ Feb. 15, 1955